Sept. 6, 1927.  
E. T. PARSONS  
1,641,781  
LOAF CREASING AND CUTTING APPARATUS  
Filed Sept. 18, 1926  
3 Sheets-Sheet 2
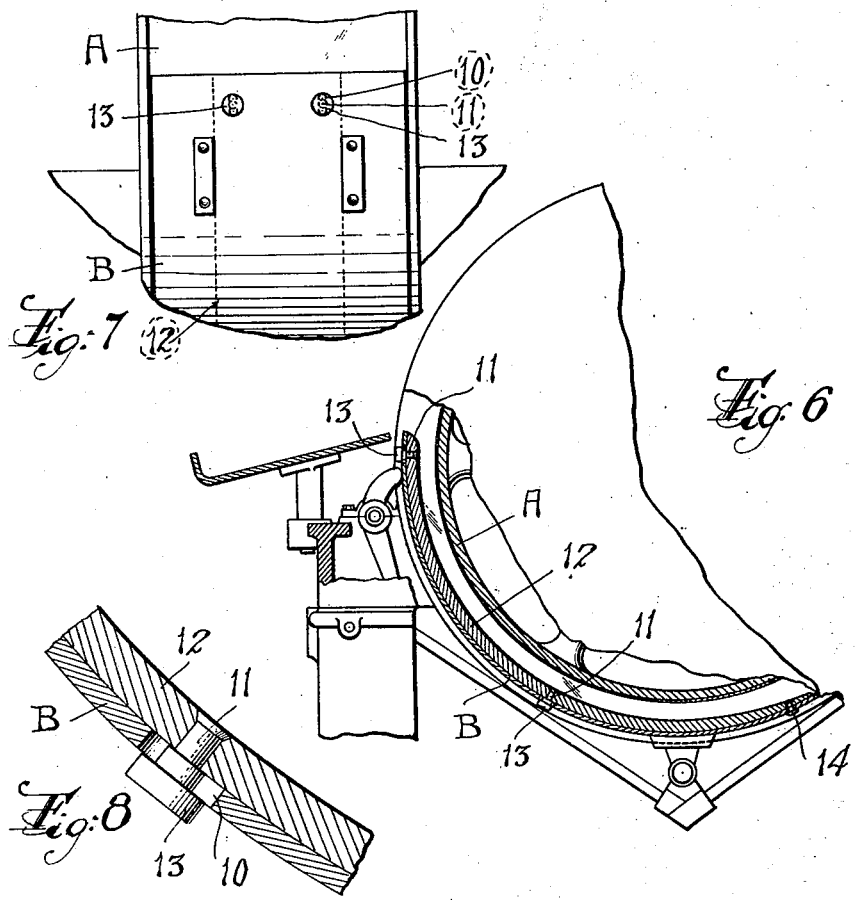
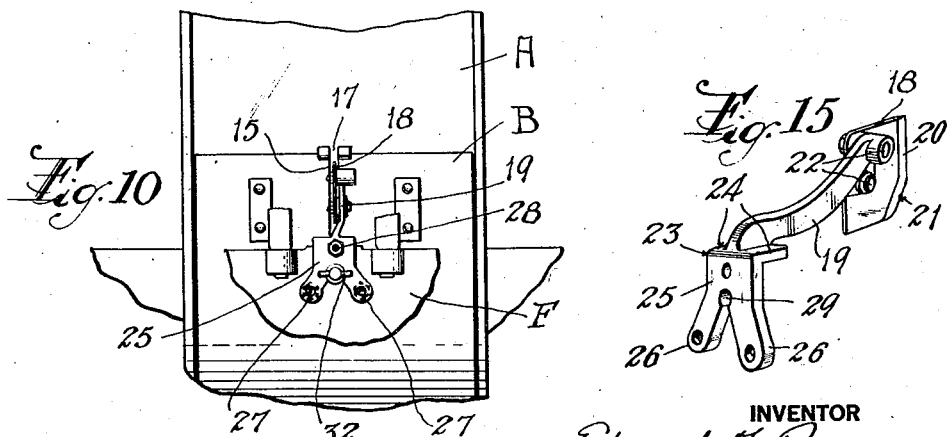
INVENTOR  
Edward T. Parsons  
BY  
Everett H. Cook,  
ATTORNEYS.

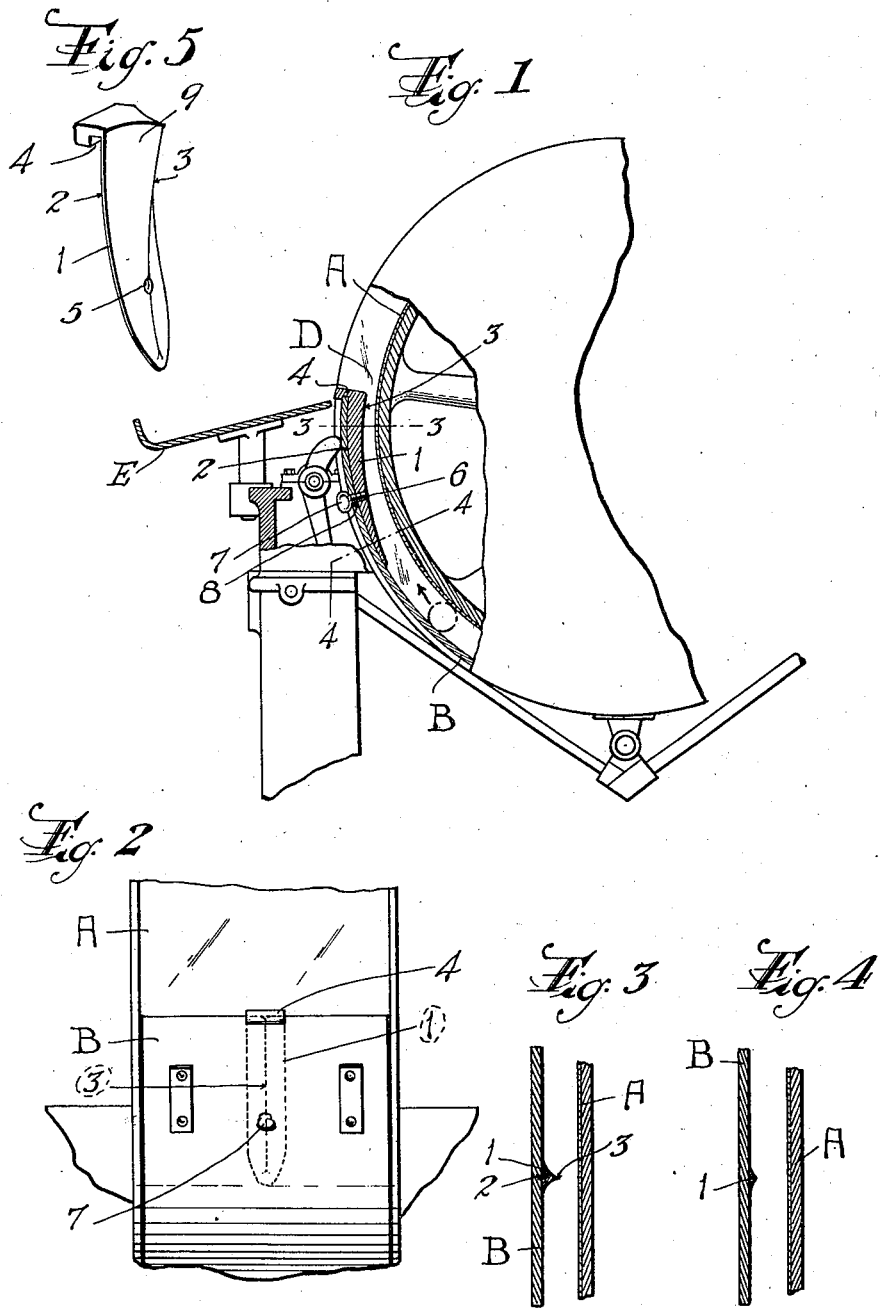

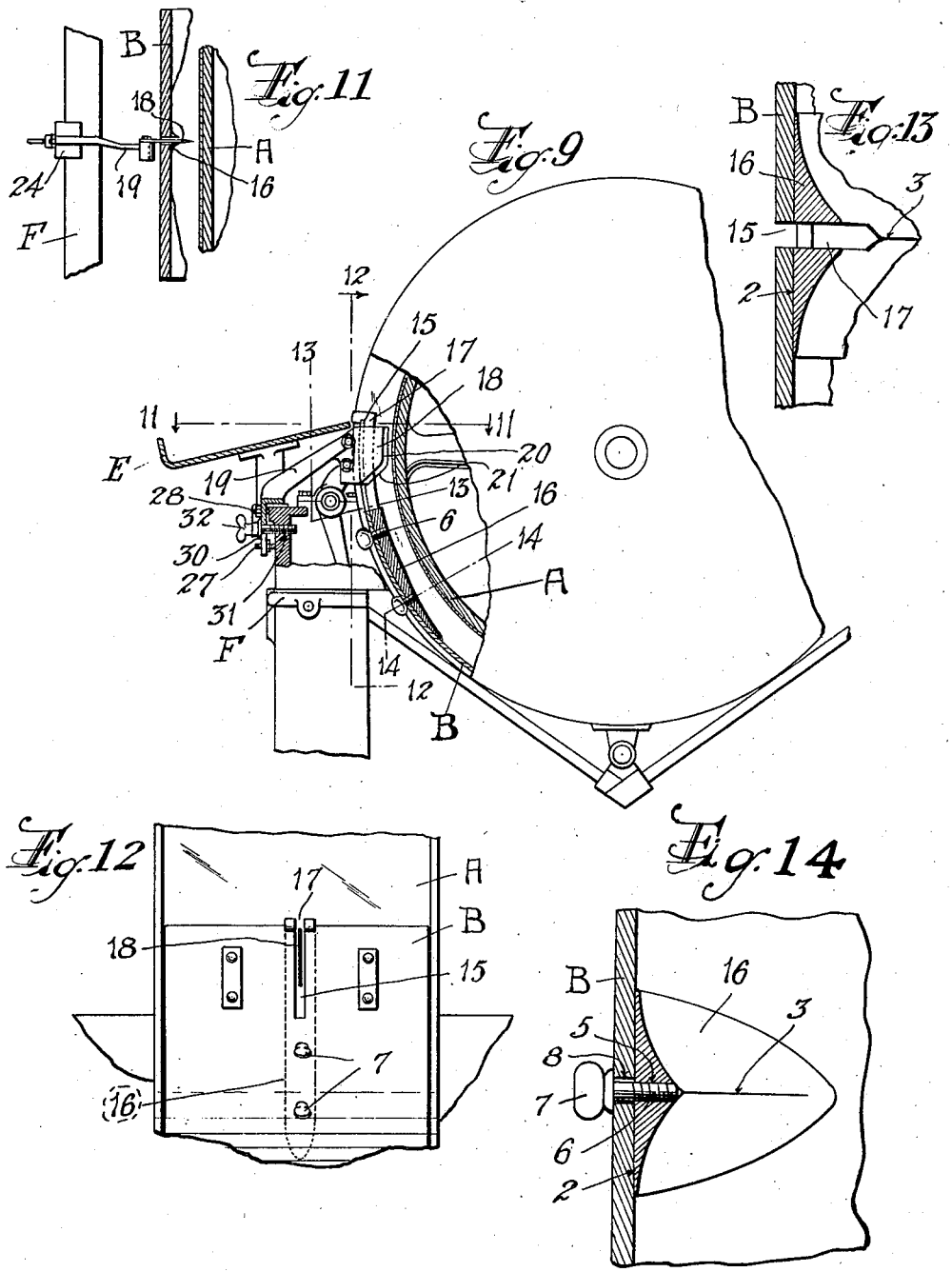

Patented Sept. 6, 1927.

1,641,781

UNITED STATES PATENT OFFICE.

EDWARD T. PARSONS, OF UPPER MONTCLAIR, NEW JERSEY, ASSIGNOR TO THOMSON MACHINE COMPANY, A CORPORATION OF NEW JERSEY.

LOAF CREASING AND CUTTING APPARATUS.

Application filed September 18, 1926. Serial No. 136,206.

This invention relates to apparatus to be used in conjunction with dough moulding machines to facilitate in dividing or to divide a cylindrical moulded piece of dough into a plurality of parts.

One object of the invention is to provide a novel and improved device or apparatus of this character whereby a cylindrical piece of dough may be circumferentially creased or indented as it passes through a dough moulding machine either to facilitate breaking of the piece or preparatory to cutting it into a plurality of parts, so that the severed ends of the plurality of parts have a minimum area of "raw" surface or surface uncoated with a film or "skin" of flour.

Another object is to provide a loaf creasing device which may be removably or separably applied to the compression plate or pressure board in fixed relation thereto so that the loaf may be rolled over the device under pressure between the compression plate and the kneading drum or belt according to the type of dough moulding machine.

A further object is to provide a loaf creasing device of novel and improved construction by which a crease or groove may be formed in a loaf with gradually increasing depth so that a minimum of distortion of the loaf is produced and the "skin" or film of flour on the portions of the loaf forming the sides of the groove or crease is unbroken.

Other objects are to provide a novel and improved combination of loaf creasing device and a blade cutter whereby the loaf may be formed with a crease or groove of a depth to nearly sever the loaf into a plurality of parts after which the loaf may be completely severed at the creased portion by the blade cutter; to provide a novel and improved construction and combination of a creasing device mounted on the compression plate or pressure board and a cutting blade mounted on the frame of the dough moulding machine in such relation to cut the piece of dough at the base of the crease or groove formed by the creasing device and before the piece of dough leaves the pressure board, and to obtain other results and advantages as may be brought out by the following description.

Referring to the accompanying drawings, in which corresponding and like parts are designated throughout the several views by the same reference characters, Figure 1 is a vertical sectional view through a loaf creasing device embodying the invention and showing the device in operative position upon the compression plate of a dough moulding machine which is fragmentarily illustrated partially in section;

Figure 2 is an end elevation of the kneading drum and the compression plate, showing the creasing device as illustrated in Figure 1;

Figures 3 and 4 are fragmentary transverse sectional views, taken on the lines 3—3 and 4—4, respectively, of Figure 1;

Figure 5 is an enlarged detached perspective view of the creasing device shown in Figure 1;

Figure 6 is a view similar to Figure 1, showing a modified form of creasing device and means for securing it to a compression plate;

Figure 7 is a view similar to Figure 2, showing the device illustrated in Figure 6;

Figure 8 is an enlarged fragmentary sectional view through one of the fastening members shown in Figure 6 for securing the creasing device to the compression plate;

Figure 9 is a view similar to Figure 1, showing a combined loaf creasing device and cutter;

Figure 10 is a view similar to Figure 2, showing the apparatus illustrated in Figure 9;

Figure 11 is a fragmentary horizontal sectional view, taken on the line 11—11 of Figure 9;

Figure 12 is a vertical sectional view, taken on the line 12—12 of Figure 9;

Figure 13 is a fragmentary enlarged transverse sectional view through the creasing device, taken on the line 13—13 of Figure 9;

Figure 14 is a similar view, taken on the line 14—14 of Figure 9, and

Figure 15 is a detached perspective view of the cutting blade.

For the purpose of illustrating the principles of the invention, I have shown the loaf creasing device embodying the invention in connection with a known type of loaf moulder, for example as shown in Patent No. 701,646 of June 3, 1902, to C. A.

Thomson, which includes a kneading drum A and an arcuate compression plate B which surrounds a part of the periphery of the drum in spaced relation thereto so that a lump of dough may be rolled between the drum and the compression plate into the form of a suitable roll. The drum is driven in any suitable manner and the compression plate is adjustable toward and from the drum to vary the pressure exerted on the roll of dough which is discharged from the compression plate at D and automatically deposited by action of gravity either upon a tray E or a panning conveyor which is sometimes used.

The creasing device consists of an elongated body 1 which is substantially triangular in cross-section and has a base side 2 shaped to conform to the compression plate B and to be snugly fitted against the kneading surface of the compression plate, as shown in Figure 1. Opposite the base 2 the creasing device is formed with an edge or rib 3 substantially centrally disposed in the width of the device and gradually diverging from said base side 2 at one end of the body to the other end. The large end of the body is formed with a hooked portion 4 adapted to take over the discharge end of the compression plate B, and intermediate its length the body 1 is formed with a screw threaded opening 5 in which is fitted a screw 6 having an operating head 7. The compression plate B has an opening 8 to register with the opening 5 in the body 1, and in securing the creasing device to the compression plate the screw 6 is passed through the opening 8 and screwed into the opening 5 with the head 7 at the outer side of the compression plate, as shown in Figure 1.

In operation, the roll of dough indicated by dot and dash lines in Figure 1 is moved in the direction of the arrow along the compression plate B and over the creasing device under pressure. The rib or edge 3 of the creasing device thus forms a crease or groove in the roll of dough so that the diameter of the roll is materially reduced at an intermediate point in its length. This creasing of the loaf permits the loaf to be easily broken at the base of the crease for the purpose of producing two loaves which are baked together to form a double loaf known in the art. A minimum of raw end is provided where the roll is broken, and the skin of the roll on the sides of the crease or groove is unbroken. Preferably the body 1 of the creasing device at opposite sides of the rib or edge 3 is curved as indicated at 9, so as to provide a sharper edge and also to gently press or displace the dough as the crease is formed.

By forming the edge or rib 3 at a greater angle to the base side 2 of the body so that when the device is installed the discharge end of the edge is practically in contact with the periphery of the kneading drum A, the creasing device may be used for completely severing or cutting the roll of dough into a plurality of pieces. As above indicated, the base side 2 of the body 1 is formed to fit against the kneading surface of the compression plate with which the creasing device is to be used, and in the present instance said base side 2 is substantially arcuate longitudinally and flat transversely to fit the particular form of arcuate compression plate B, and accordingly the creasing edge or rib 3 is also curved longitudinally.

The creasing device may be secured to a compression plate in many other ways than by means of the hook 4 and fastening screw 6, and one other form of fastening means is shown in Figure 6 of the drawings wherein the compression plate is formed with circumferentially extending slots 10 through which pass the shanks of rivets 11 having one end riveted to the creasing device 12 and the other end extending outwardly through the corresponding slot 10 and formed with an enlarged head 13 which overlies the outer surface of the compression plate. One end of the creasing device may be fixedly secured to the compression plate as by a rivet 14. This construction is particularly desirable where a long creasing device is used, since the slots 10 permit relative longitudinal movement of the compression plate and the creasing device so as to accommodate adjustments in the curvature of the compression plate incident to moving the same toward and from the kneading drum A. Of course, the fastening members 11 and 14 might be separably connected to the creasing device 12.

In some cases it is desirable to first crease the cylindrical roll of dough and subsequently cut it at the base of the crease instead of utilizing the creasing device itself for completely servering the roll of dough. A construction for this purpose is shown in Figures 9–15 inclusive, wherein the compression plate is formed with a circumferential slot 15 opening through the discharge end thereof, and the creasing device 16 is provided with a longitudinal slot 17 to register with said slot 15 when the creasing device is applied to the compression plate. The slot 17 is disposed substantially centrally of the width of the creasing device and opens through the creasing edge or rib, as clearly shown in Figures 9 and 13. The creasing device is secured to the compression plate in substantially the same manner as shown in Figure 1 of the drawings.

A cutting blade 18 is mounted on a bracket 19 which in turn is separably fastened upon the frame F of the dough moulding machine, said blade extending through the slots 15 and 17 in the compression plate and creasing device, respectively, with its cutting edge 20 in close proximity with the periphery of the kneading drum A. The cutting edge 20 of the blade has one end flared or inclined outwardly from the periphery of the drum, as indicated at 21, to receive a roll of dough. With this construction, the roll of dough is first circumferentially creased by the creasing edge of the device 16 in the same manner as in the construction of Figure 1 of the drawings, after which the roll is moved by the drum against the cutting edge 21, 20 of the blade 18 which severs the roll with a shearing action at the base of the crease. The plurality of sections of the roll are then deposited upon the discharge tray E.

The blade 18 is preferably adjustably mounted so that it may be moved toward or from the periphery of the kneading drum to properly sever the roll of dough, and as shown in the drawings the mounting of the blade may include the bracket 19 to one end of which the blade is secured as by bolts 22. The other end of the bracket is formed with an angluar base 23 one arm 24 of which is adapted to overlie the top of the frame F of the dough moulding machine while the other arm 25 is adapted to lie alongside of the vertical end wall of the frame F. The arm 25 is also preferably bifurcated to form outwardly diverging fingers 26 in each of which is arranged an adjustable set screw 27. Another adjustable set screw 28 is mounted in the arm 25 adjacent the meeting thereof with the arm 24. At the meeting point of the fingers 26 the arm 25 has an opening 29 to loosely receive a clamping screw 30 one end of which is screw threaded to fit a correspondingly threaded opening 31 in the vertical end wall of the dough moulding machine frame F. The other end of the screw 30 has an operating head 32 to abut the outer side of the arm 25. With this construction, the bracket is secured to the frame F with the arm 24 resting on the top of the frame and the set screws 27 and 28 bearing against the vertical end wall of the frame F. The clamping screw 30 securely holds the bracket upon the frame F against both vertical and horizontal movement. Obviously, by adjusting the set screws 27 and 28 the location of the bracket on the frame F may be varied to locate the cutting edge 20 of the blade 18 nearer to or farther away from the periphery of the drum A.

While I have shown only one creasing device used on a single compression plate, it will be understood that where it is desired to produce more than one crease in a roll of dough the number of creasing devices will be correspondingly varied. For example, should it be desired to crease or cut the roll of dough into three sections, two creasing devices would be used, and so on.

It will be understood that the particular forms of creasing devices herein illustrated and described are the best now known to me, but are primarily illustrative of the principles of the invention, and the details of construction of the apparatus and the use thereof may be modified and changed by those skilled in the art without departing from the spirit or scope of the invention. Therefore, I do not desire to be understood as limiting myself except as required by the following claims when construed in the light of the prior art.

Having thus described the invention, what I claim is:

1. The combination with a dough moulding machine including a compression plate and a cooperating kneading member to receive and roll a piece of dough between them into cylindrical form, of a device mounted on said compression plate and projecting from the kneading surface thereof to circumferentially crease or groove said cylindrical piece of dough, one end of said device being formed to hook over one end of said compression plate, and fastening means for securing said device against lateral movement on said compression plate.

2. The combination with a dough moulding machine including a compression plate and a cooperating kneading member to receive and roll a piece of dough between them into cylindrical form, of a device mounted on said compression plate and projecting from the kneading surface thereof to circumferentially crease or groove said cylindrical piece of dough, one end of said device being formed to hook over one end of said compression plate, said device and said compression plate having registering openings, and fastening members arranged in said openings to secure said device on said plate.

3. The combination with a dough moulding machine including a compression plate and a cooperating kneading member to receive and roll a piece of dough between them into cylindrical form, of a device mounted on said compression plate and projecting from the kneading surface thereof to circumferentially crease or groove said cylindrical piece of dough, one end of said device being formed to hook over one end of said compression plate, said device having a screw threaded opening in the side thereof contacting with said compression plate and said compression plate having an opening registering with the opening in said device, and a cap screw passing through said opening in said plate and screwed into said opening in said device.

4. A dough creasing device comprising an elongated body substantially triangular in cross-section and gradually increasing in thickness or tapering from one end to the other, said body being of hooked form at the larger end thereof to hook over the edge of a compression plate in a dough moulding machine and having a screw threaded opening in the base side thereof, and a cap screw removably fitted in said opening.

5. The combination with a dough moulding machine including a compression plate and a cooperating kneading member to receive and roll a piece of dough between them into cylindrical form, of a device mounted on said compression plate and projecting from the kneading surface thereof to circumferentially crease or groove said cylindrical piece of dough, said compression plate and said device having registering slots, and a cutting blade mounted on said dough moulding machine and projecting through said slot toward said kneading member to sever said cylindrical piece of dough at the crease or groove formed by said device.

6. The combination with a dough moulding machine including a compression plate and a cooperating kneading member to receive and roll a piece of dough between them into cylindrical form, of a device comprising an elongated body substantially triangular in cross-section with the base gradually increasing in thickness from one end to the other and fitted upon the kneading surface of said compression plate and the opposite longitudinal edge or ridge extending toward and in spaced relation to said kneading member and in the path of movement of said piece of dough, said device having a longitudinal slot opening through said edge or ridge and said compression plate having a registering slot, and a cutting blade mounted upon said dough moulding machine and projecting through said slots toward said kneading member to sever said cylindrical piece of dough at the crease or groove formed by said device.

EDWARD T. PARSONS.